(12) United States Patent
Mouri et al.

(10) Patent No.: US 7,068,584 B2
(45) Date of Patent: Jun. 27, 2006

(54) SIGNAL PROCESSOR

(75) Inventors: Hiroki Mouri, Osaka (JP); Hiroyuki Nakahira, Kyoto (JP); Akira Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 455 days.

(21) Appl. No.: 10/376,247

(22) Filed: Mar. 3, 2003

(65) Prior Publication Data

US 2003/0198165 A1 Oct. 23, 2003

(30) Foreign Application Priority Data

Apr. 23, 2002 (JP) ............................... 2002-121119

(51) Int. Cl.
*G11B 7/00* (2006.01)

(52) U.S. Cl. .............................. 369/124.1; 369/124.11; 369/59.22; 369/53.35

(58) Field of Classification Search ..................... None
See application file for complete search history.

(56) References Cited

U.S. PATENT DOCUMENTS

| | | | |
|---|---|---|---|
| 4,575,857 A * | 3/1986 | Murakami | .................. 375/230 |
| 5,475,669 A * | 12/1995 | Yamamoto | ............... 369/53.35 |
| 6,141,168 A * | 10/2000 | Takahashi et al. | ............ 360/66 |
| 6,476,992 B1 * | 11/2002 | Shimatani | ................... 360/46 |

FOREIGN PATENT DOCUMENTS

| | | |
|---|---|---|
| JP | P2000-200462 A | 7/2000 |
| JP | 2001-126261 | 5/2001 |
| JP | 2001-266483 | 9/2001 |
| JP | 2002-008315 | 1/2002 |

* cited by examiner

*Primary Examiner*—William Korzuch
*Assistant Examiner*—Tawfik Goma
(74) *Attorney, Agent, or Firm*—McDermott Will & Emery LLP

(57) ABSTRACT

The signal processor includes an analog filter, an analog-to-digital (A-D) converter, an adaptive equalization filter, a quality value calculating circuit, and a control circuit. The analog filter removes high-frequency noises of a played-back signal from a recording medium and amplifies a specific frequency band of the played-back signal. The A-D converter converts the played-back signal from the analog filter into a digital signal. The adaptive equalization filter performs waveform equalization of the played-back signal from the A-D converter while adjusting a tap coefficient of the adaptive equalization filter so as to reduce a difference between an output of the adaptive equalization filter and a target value. The quality value calculating circuit calculates a quality value based on the difference between the output of the adaptive equalization filter and the target value. The control circuit compares the quality value calculated by the quality value calculating circuit with a predetermined reference value, and conducts a process for improving the quality value according to the comparison result.

9 Claims, 6 Drawing Sheets

| TOC | ANALOG FILTER | FIR FILTER | LMS CIRCUIT |
|-----|---------------|------------|-------------|
| t1  | p11           | p12        | p13         |
| t2  | p21           | p22        | p23         |
| ⋮   | ⋮             | ⋮          | ⋮           |

SIGNAL PROCESSOR

BACKGROUND OF THE INVENTION

The present invention generally relates to a signal processor. More particularly, the present invention relates to a signal processor for processing a played-back signal from a recording medium such as a magnetic disk and an optical disk.

There is a variation between manufactured play-back apparatuses for a magnetic disk and an optical disk in terms of the capability (quality) of accurately playing back data recorded on the disk. Accordingly, the play-back apparatuses for a magnetic disk and an optical disk have a function to evaluate the quality of the apparatus. If the quality of the apparatus is low, various adjustments are made in order to improve the quality. For example, the quality of the apparatus is evaluated and adjustments of the apparatus are made if the apparatus gets out of order during inspection before shipment, or after shipment.

One example of a method for evaluating the quality of the play-back apparatus is to measure the bit error rate (bER) of the played-back data and evaluate the quality of the play-back apparatus by using the measured bit error rate as a quality value. The quality value obtained by this method is reliable as the data which most strongly correlates with a substantial quality index of the play-back apparatus. However, this method is not practical because it is difficult to process data in real time and a large circuit scale is required in order to deal with a large amount of data.

SUMMARY OF THE INVENTION

It is an object of the present invention to provide a signal processor capable of obtaining a quality value which strongly correlates with a substantial quality index of a play-back apparatus.

According to the present invention, a signal processor includes an analog filter, an analog-to-digital (A-D) converter, an adaptive equalization filter, a quality value calculating circuit, and a control circuit. The analog filter removes high-frequency noises of a played-back signal from a recording medium and amplifies a specific frequency band of the played-back signal. The A-D converter converts the played-back signal from the analog filter into a digital signal. The adaptive equalization filter performs waveform equalization of the played-back signal from the A-D converter while adjusting a tap coefficient of the adaptive equalization filter so as to reduce a difference between an output of the adaptive equalization filter and a target value. The quality value calculating circuit calculates a quality value based on the difference between the output of the adaptive equalization filter and the target value. The control circuit compares the quality value calculated by the quality value calculating circuit with a predetermined reference value, and conducts a process for improving the quality value according to the comparison result.

Preferably, the signal processor further includes a memory. The memory stores unique reference information of a recording medium together with a corresponding parameter. The parameter is used to adjust the analog filter and the adaptive equalization filter so that a quality value upon playing back a recording medium having corresponding reference information becomes smaller than the reference value.

Preferably, the control circuit compares reference information of a recording medium to be played back with the reference information stored in the memory. When the reference information of the recording medium to be played back matches the reference information stored in the memory, the control circuit adjusts the analog filter and the adaptive equalization filter according to the parameter stored together with the reference information in the memory.

Preferably, when reference information of a recording medium to be played back matches the reference information stored in the memory, the control circuit stops operation of the quality value calculating circuit.

Preferably, the adaptive equalization filter performs PR (Partial Response) equalization of the played-back signal from the A-D converter. The quality value calculating circuit calculates a quality value for each output level of the adaptive equalization filter based on a difference between each output level of the adaptive equalization filter and a corresponding target value.

Preferably, the control circuit weights the tap coefficient of the adaptive equalization filter according to each quality value calculated by the quality value calculating circuit.

Preferably, the quality value calculating circuit calculates an average value of absolute values of the difference between the output of the adaptive equalization filter and the target value within a prescribed time, and outputs the calculated average value as a quality value.

Preferably, the signal processor further includes a display. The display displays the quality value calculated by the quality value calculating circuit.

Preferably, the control circuit changes filter characteristics of the analog filter according to the comparison result.

Preferably, the control circuit discontinues updating of the tap coefficient of the adaptive equalization filter according to the comparison result.

According to the present invention, the influences of a vertically asymmetric waveform (resulting from an asymmetry phenomenon which occurs during manufacturing of the disk, or the like) and a tilted disk (resulting from warping of the disk, or the like) on the system can be corrected with a relatively simple circuit structure. Moreover, the quality of a transmission path can be quantitatively determined on the time base. This enables implementation of real-time feedback to the system. By compensating for the quality of the transmission path by combination of the present invention and one or more of the existing various signal processing methods, a signal processor capable of not only improving the signal processing capability but also compensating for the quality can be obtained.

DESCRIPTION OF THE PREFERRED EMBODIMENTS

Figure 1:
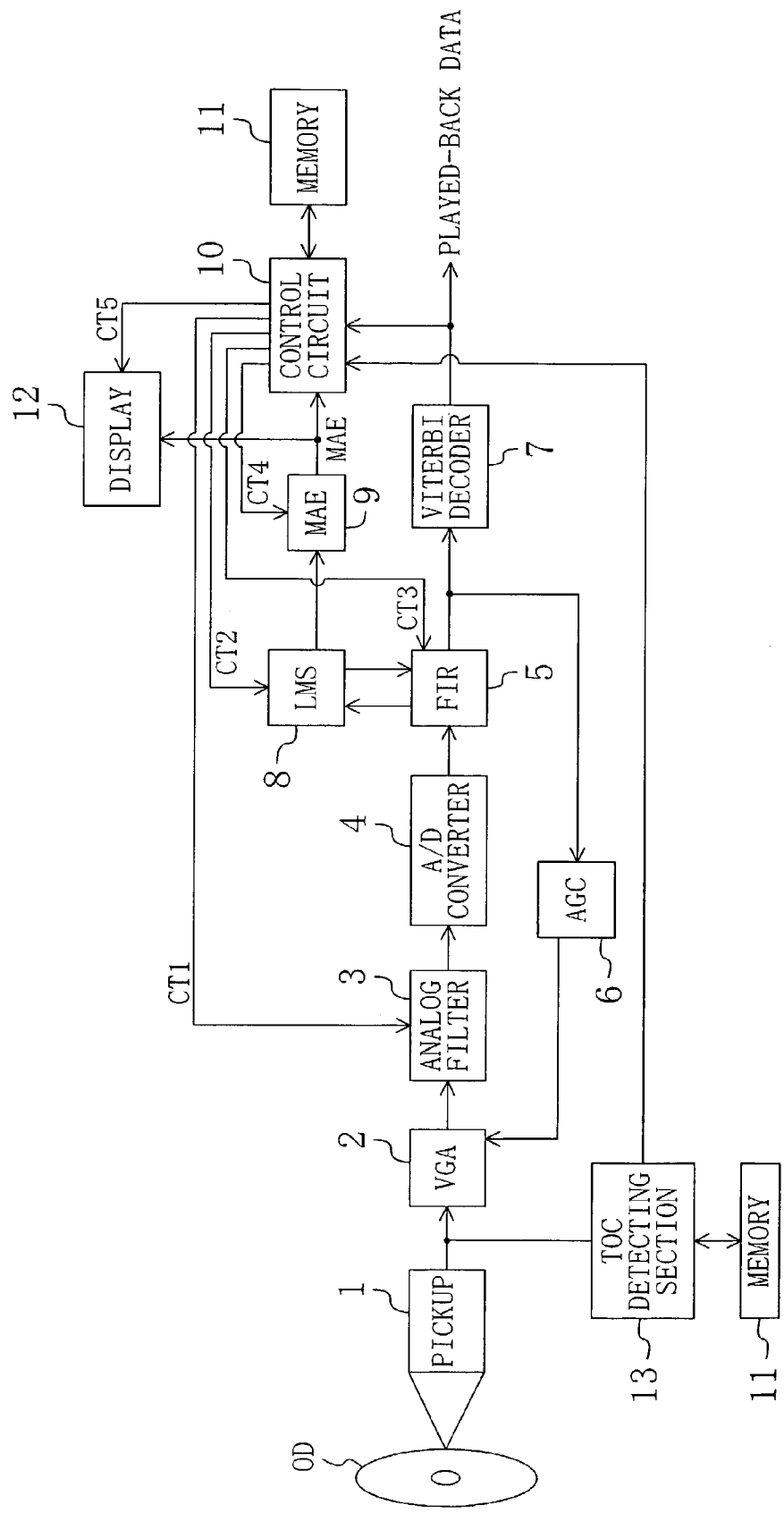
FIG. 1 is a block diagram showing the overall structure of an optical-disk play-back apparatus according to an embodiment of the present invention.

Hereinafter, an embodiment of the present invention will be described in detail with reference to the accompanying drawings. Note that the same or corresponding portions are denoted with the same reference numerals and characters, and description thereof will not be repeated. [Overall Structure of the Optical-Disk Play-Back Apparatus]

FIG. 1 is a block diagram showing the overall structure of an optical-disk play-back apparatus according to an embodiment of the present invention. The play-back apparatus of FIG. 1 processes a played-back signal from an optical disk by PRML (Partial Response Maximum Likelihood) signal processing technology. The play-back apparatus of FIG. 1 includes a pickup 1, a variable gain amplifier (VGA) 2, an analog filter 3, an analog-to-digital (A-D) converter 4, a transversal filter (FIR (Finite Impulse Response) filter) 5, an automatic gain control circuit (AGC) 6, a Viterbi decoder 7, an LMS (Least Mean Square) circuit 8, an MAE (Mean Absolute Error) circuit 9, a control circuit 10, a memory 11, a display 12, and a TOC (Table of Contents) detecting section 13.

The pickup 1 converts reflected laser light from a pit on an optical disk OD into an electric signal, and outputs the electric signal as a played-back signal.

The VGA 2 amplifies the played-back signal from the pickup 1 with a gain corresponding to a gain control signal from the AGC 6.

The analog filter 3 removes high-frequency noises of the played-back signal received from the VGA 2, and amplifies a specific frequency band of the played-back signal. The analog filter 3 amplifies a specific frequency band in order to equalize frequency characteristics of the played-back signal to PR (Partial Response) characteristics.

The analog filter 3 is capable of changing its filter characteristics (such as boost amount and cutoff frequency) according to a control signal CT1 from the control circuit 10.

The A-D converter 4 converts the played-back signal from the analog filter 3 into a digital signal.

The LMS circuit 8 calculates a tap coefficient (filter coefficient) by using an LMS (Least Mean Square) algorithm, and outputs the tap coefficient to the FIR filter 5. The LMS circuit 8 updates the tap coefficient so as to reduce the difference between an output value of the FIR filter 5 and a target value (i.e., equalization error). The LMS circuit 8 outputs the equalization error (the difference between the output value of the FIR filter 5 and the target value) obtained during calculation of the tap coefficient to the MAE circuit 9. The LMS circuit 8 is operated and stopped in response to a control signal CT2 from the control circuit 10. The LMS circuit 8 is capable of changing the step size of the LMS algorithm according to the control signal CT2 from the control circuit 10.

The FIR filter 5 has a preset tap coefficient (filter coefficient) calculated by the LMS circuit 8. The FIR filter 5 performs waveform equalization of the played-back signal from the A-D converter 4. The FIR filter 5 is capable of changing the respective preset values of the number of taps and the tap coefficient according to a control signal CT3 from the control circuit 10. Note that the LMS circuit 8 and the FIR filter 5 form an adaptive equalization filter. This adaptive equalization filter performs PR equalization of the played-back signal from the A-D converter 4.

The AGC 6 outputs a gain control signal of the level corresponding to the difference between the played-back signal from the FIR filter 5 and a predetermined reference value.

The Viterbi decoder 7 decodes the played-back signal from the FIR filter 5 by a Viterbi algorithm into played-back data.

The MAE circuit 9 calculates an average value of absolute values of the equalization error (the difference between the output value of the FIR filter 5 and the target value) received from the LMS circuit 8, and outputs the average value as a quality value MAE of the play-back apparatus. The MAE circuit 9 is operated and stopped in response to a control signal CT4 from the control circuit 10.

The control circuit 10 controls the overall operation of the play-back apparatus. The control circuit 10 compares the quality value MAE from the MAE circuit 9 with a predetermined reference value d, and outputs control signals CT1 to CT5 according to the comparison result. The control circuit 10 writes and reads data to and from the memory 11. The control circuit 10 outputs the control signals CT1 to CT4 according to the data stored in the memory 11.

The memory 11 stores respective TOCs (Tables of Contents) of disks together with various corresponding parameters of the play-back apparatus.

The display 12 displays the quality value MAE from the MAE circuit 9 in response to the control signal CT5 from the control circuit 10.

The TOC detecting section 13 reads a TOC from the optical disk OD.

[Quality Evaluation and Adjustment]

Figure 2:
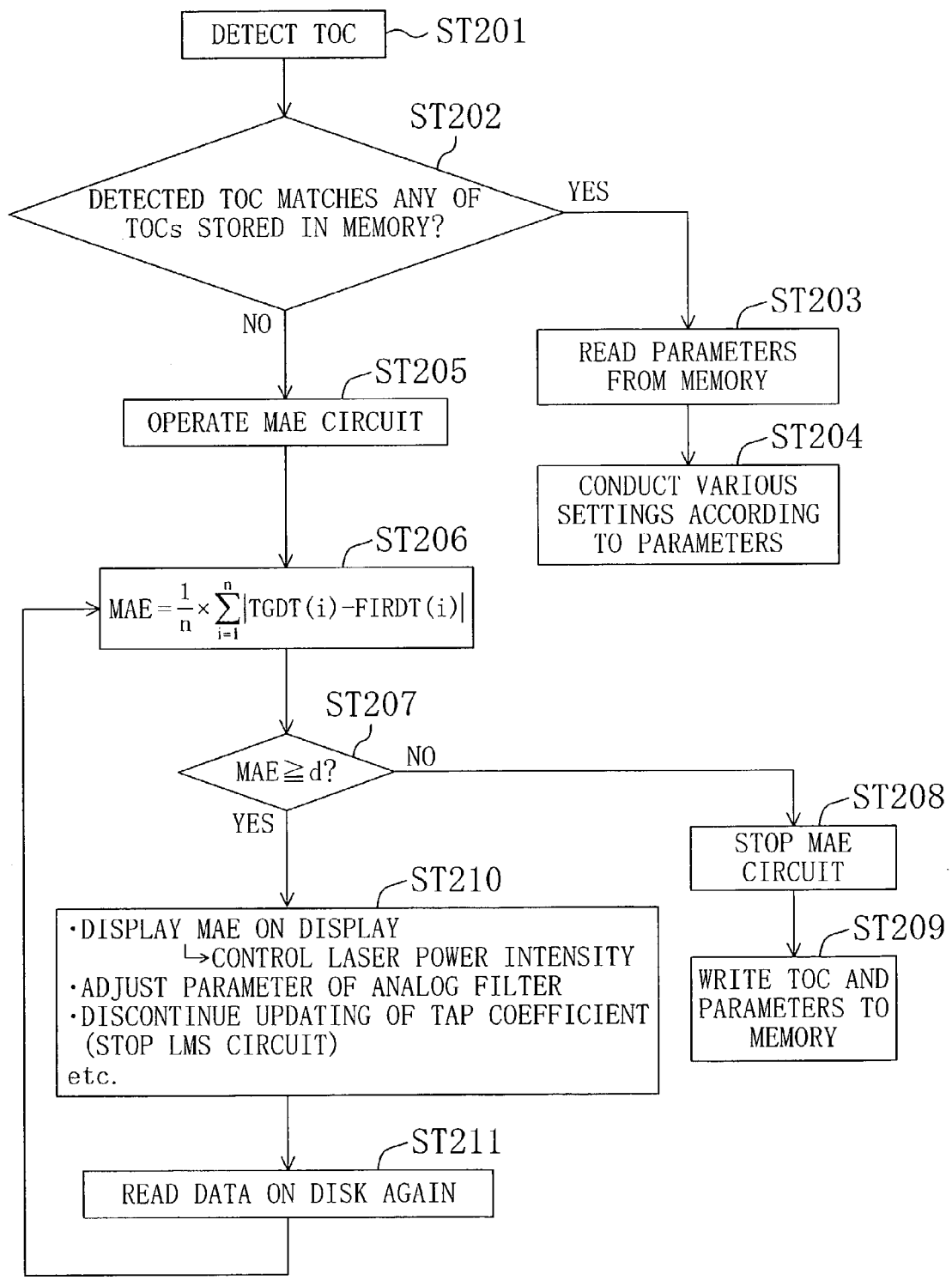
FIG. 2 is a flowchart of a process of quality evaluation and adjustment which is conducted by the optical-disk play-back apparatus of FIG. 1.

Hereinafter, quality evaluation and adjustment by the optical-disk play-back apparatus of FIG. 1 will be described with reference to FIG. 2.

[Step ST201]

First, a TOC is read from the optical disk OD. The TOC is reference information of the optical disk OD itself, and is used to avoid illegal copying and used as a table of software contents, and the like.

[Step ST202]

Figures 3, 4:
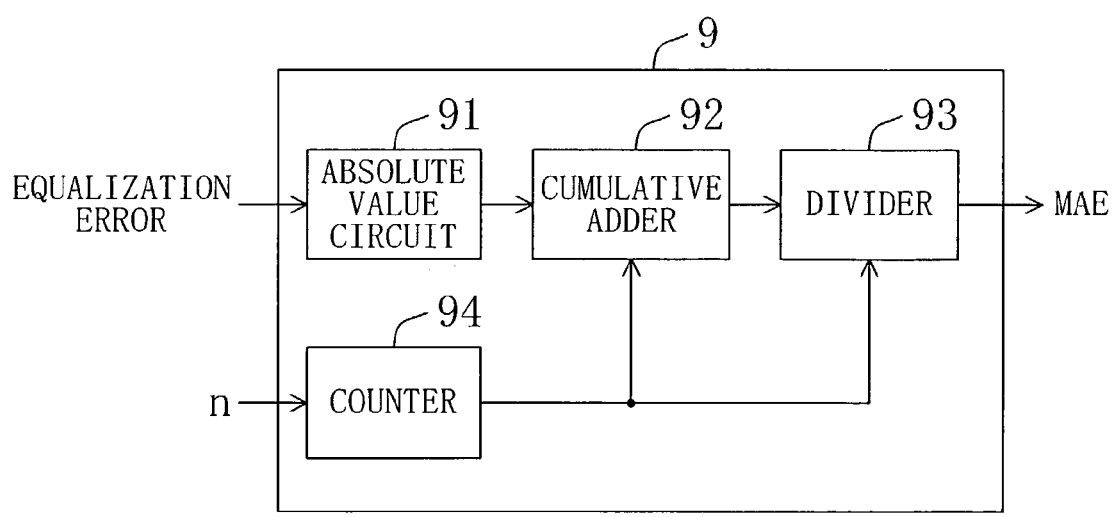
FIG. 3 shows an example of TOCs (Tables of Contents) and parameters which are stored in a memory of FIG. 1.
FIG. 4 is a block diagram showing the internal structure of a MAE (Mean Absolute Error) circuit of FIG. 1.

The control circuit 10 compares the TOC read in step ST201 with the TOCs stored in the memory 11. As shown in FIG. 3, the memory 11 stores TOCs (t1, t2, . . . ) together with corresponding parameters (p11 to p13, p21 to p23, . . . ). The parameters (p11, p21, . . . ) are used to adjust the filter characteristics of the analog filter 3. The parameters (p12, p22, . . . ) are used to adjust the respective preset values of the number of taps and the tap coefficient of the FIR filter 5. The parameters (p13, p23, . . . ) are used to adjust the step size of the LMS algorithm performed in the LMS circuit 8. These parameters are used to adjust the analog filter 3, the FIR filter 5 and the LMS circuit 8 so that the quality value MAE of the play-back apparatus upon playing back a disk having a corresponding TOC becomes smaller than the reference value d. In other words, by adjusting the analog filter 3, the FIR filter 5 and the LMS circuit 8 based on these parameters, the quality value MAE of the play-back apparatus upon playing back a disk having a corresponding TOC becomes smaller than the reference value d.

If the TOC read in step ST201 matches any one of the TOCs stored in the memory 11, the routine proceeds to step ST203. If the TOC read in step ST201 does not match any of the TOCs stored in the memory 11, the routine proceeds to step ST205.

[Step ST205]

If the TOC read in step ST201 does not match any of the TOCs stored in the memory 11, the control circuit 10 applies a control signal CT4 for activating the MAE circuit 9 to the MAE circuit 9. The MAE circuit 9 starts its operation in response to the control signal CT4.

[Step ST206]

Based on the difference between an output value of the FIR filter 5 and a target value (a theoretical value as a target equalization level), that is, the equalization error, the MAE circuit 9 calculates a quality value MAE according to the following equation:

$$MAE = \frac{1}{n} \times \sum_{i=1}^{n} |TGDT(i) - FIRDT(i)|.$$

In the above equation, TGDT is a target value, FIRDT is an output value of the FIR filter 5, and n is the number of times cumulative addition is performed.

FIG. 4 shows the internal structure of the MAE circuit 9. The MAE circuit 9 includes an absolute value circuit 91, a cumulative adder 92, a divider 93, and a counter 94. The absolute value circuit 91 calculates an absolute value of the equalization error (the difference between an output value of the FIR filter 5 and a target value) from the LMS circuit 8. The cumulative adder 92 obtains a cumulative sum of absolute values calculated by the absolute value circuit 91. The number of absolute values to be cumulatively added by the cumulative adder 92 is controlled by the counter 94 (in this example, n absolute values). The divider 93 divides (normalizes) the cumulative sum obtained by the cumulative adder 92 by a controlled number (in this example, n), and outputs the resultant value as a quality value MAE. After the normalization, the quality value MAE is initialized, and loop processing for calculating the quality value MAE is started.

[Step ST207]

The control circuit 10 compares the quality value MAE calculated by the MAE circuit 9 with the reference value d. The reference value d is determined according to the bit error rate required for the play-back apparatus. If the quality value MAE is smaller than the reference value d, the routine proceeds to step ST208. If the quality value MAE is equal to or larger than the reference value d, the routine proceeds to step ST210.

[Step ST210]

If the quality value MAE is equal to or larger than the reference value d, various adjustments are made as described below in order to improve the quality value MAE of the play-back apparatus.

[Display the Quality Value MAE on the Display 12]

The control circuit 10 applies an active control signal CT5 to the display 12. In response to the active control signal CT5, the display 12 digitally displays the quality value MAE from the MAE circuit 9. This makes the quality value MAE visually clear. Based on the quality value MAE displayed on the display 12, various adjustments are made in order to improve performance (quality) of the play-back apparatus. For example, laser power is controlled with reference to the quality value MAE displayed on the display 12. In other words, the laser power intensity is adjusted for focusing in order to clearly read data from the optical disk OD. This improves accuracy of read operation of the pickup 1.

[Adjust the Filter Characteristics of the Analog Filter 3]

The control circuit 10 applies a control signal CT1 for changing the filter characteristics to the analog filter 3. In response to the control signal CT1, the analog filter 3 changes its filter characteristics (e.g., a parameter such as a boost value). The analog filter 3 is thus optimized with reference to the quality value MAE. The analog filter 3 is initialized, and the quality value MAE is detected in this state. If it is determined that the detected quality value MAE has reached the limit of error correction, the boost value of the analog filter 3 is changed to an optimal state of the filter characteristics. After the optimal state is reached, unnecessary setting can be prevented from being conducted.

[Discontinue Updating of the Tap Coefficient]

The control circuit 10 applies an inactive control signal CT2 to the LMS circuit 8. In response to the inactive control signal CT2, the LMS circuit 8 stops its operation. In response to this, updating of the tap coefficient of the FIR filter 8 is discontinued.

[Others]

In addition to the above adjustments, processes of changing the step size of the LMS algorithm, changing the number of taps of the FIR filter 5, and the like are conducted.

The various adjustments described above may be made independently or in combination of two or more.

[Step ST211]

After various adjustments are made, the data on the disk OD is read again. The routine then returns to step ST206, and the quality value MAE is calculated again.

[Step ST208]

If the quality value MAE calculated by the MAE circuit 9 is smaller than the reference value d, the control circuit 10 applies an inactive control signal CT4 to the MAE circuit 9. In response to the inactive control signal CT4, the MAE circuit 9 stops its operation. Whether the MAE circuit 9 is operated or not is thus selected according to the control signal CT4. In this way, a sleep function works, whereby power consumption can be reduced.

[Step ST209]

Thereafter, the control circuit 10 writes the TOC together with corresponding parameters to the memory 11. These parameters indicate the filter characteristics of the analog filter 3, the respective preset values of the number of taps and the tap coefficient of the FIR filter 5, and the step size of the LMS algorithm performed in the LMS circuit 8 which are obtained at the time the quality value MAE becomes smaller than the reference value d.

[Step ST203]

If the TOC read in step ST201 matches any one of the TOCs stored in the memory 11, the control circuit 10 reads the parameters corresponding to this TOC from the memory 11.

[Step ST204]

The control circuit 10 outputs control signals CT1 to CT3 according to the parameters read in step ST203. The analog filter 3 changes its filter characteristics in response to the control signal CT1. The LMS circuit 8 changes the step size of the LMS algorithm in response to the control signals CT2. The FIR filter 5 changes the respective preset values of the number of taps and the tap coefficient in response to the control signal CT3.

As described above, the parameters stored in the memory 11 indicate the filter characteristics of the analog filter 3, the respective preset values of the number of taps and the tap coefficient of the FIR filter 5, and the step size of the LMS algorithm performed in the LMS circuit 8 which are obtained at the time the quality value MAE upon playing back a disk having a corresponding TOC becomes smaller than the reference value d.

The same TOC means the same recording medium. It is therefore obvious that the disk has the same asymmetry amount, the same tilt angle and the like. Since the limit of the error correction capability of the play-back apparatus is also the same, the quality value MAE need not be recalculated.

The optical-disk play-back apparatus according to the embodiment of the present invention calculates a cumulative sum of absolute values of the difference between an output value of the FIR filter 5 and an ideal value (target value), that is, the equalization error, within a prescribed time in order to obtain an average value of the absolute values and output the average value as a quality value MAE of the play-back apparatus. Accordingly, a quality value which strongly correlates with a substantial quality index of the play-back apparatus can be obtained while suppressing increase in circuit scale.

The MAE circuit 9 uses the equalization error (the difference between an output value of the FIR filter 5 and a target value) obtained during calculation of the tap coefficient by the LMS circuit 8. This enables reduction in circuit scale of the MAE circuit 9.

If the TOC read from the disk matches any one of the TOCs stored in the memory 11, the parameters corresponding to this TOC are read from the memory 11, and various settings are made according to these parameters. This eliminates the need to recalculate the quality value MAE for the same disk, enabling reduction in processing amount.

Figure 5:
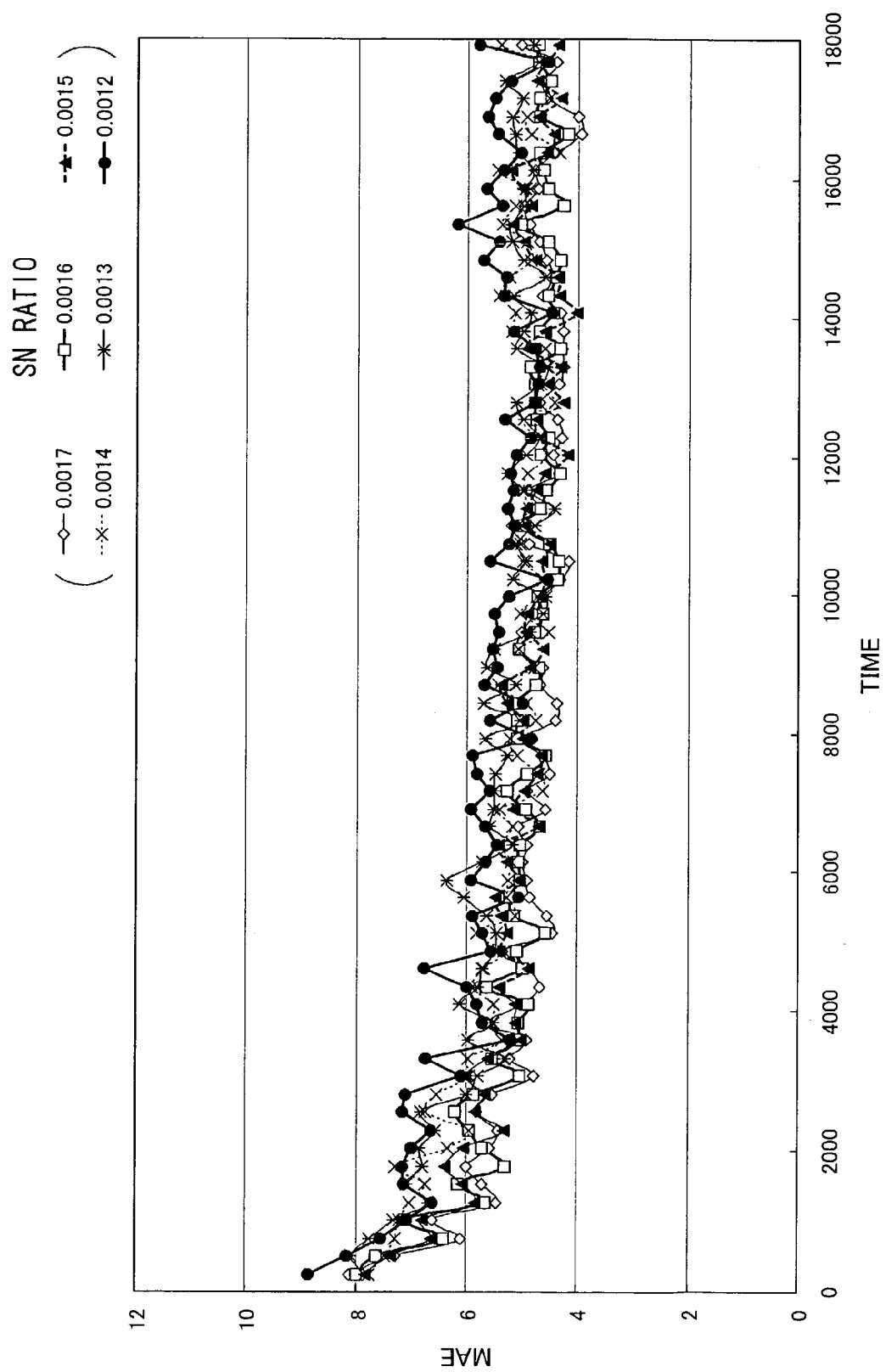
FIG. 5 shows time shift of a quality value obtained by the MAE circuit of FIG. 1.

As has been described above, according to the embodiment of the present invention, the influences of a vertically asymmetric waveform (resulting from an asymmetry phenomenon which occurs during manufacturing of the disk, or the like) and a tilted disk. (resulting from warping of the disk, or the like) on the system can be corrected with a relatively simple circuit structure. Moreover, as shown by the value MAE of FIG. 5, the quality of a transmission path can be quantitatively determined on the time base. This enables implementation of real-time feedback to the system. By compensating for the quality of the transmission path by combination of the present invention and one or more of the existing various signal processing methods, a signal processor capable of not only improving the signal processing capability but also compensating for the quality can be obtained.

Note that, in the above description, the present invention is applied to the optical-disk play-back apparatus. However, the present invention is similarly applicable to a magnetic-disk play-back apparatus.

[Modification]

Figure 6:
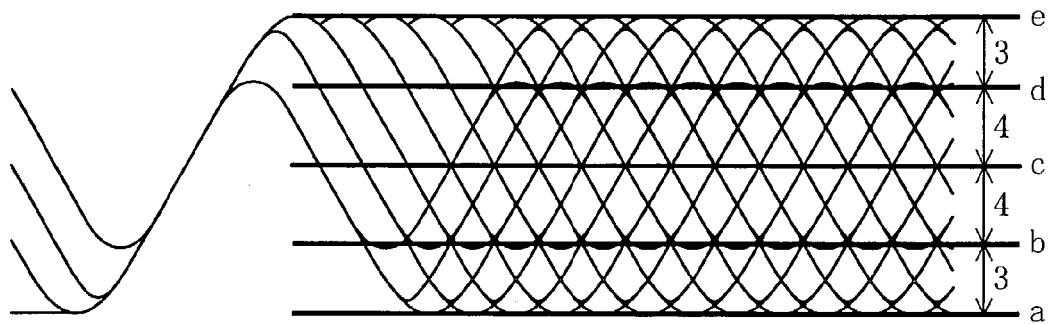
FIG. 6 shows the output of a FIR (Finite Impulse Response) filter according to a PR(3, 4, 4, 3)ML method.
Figure 7A:
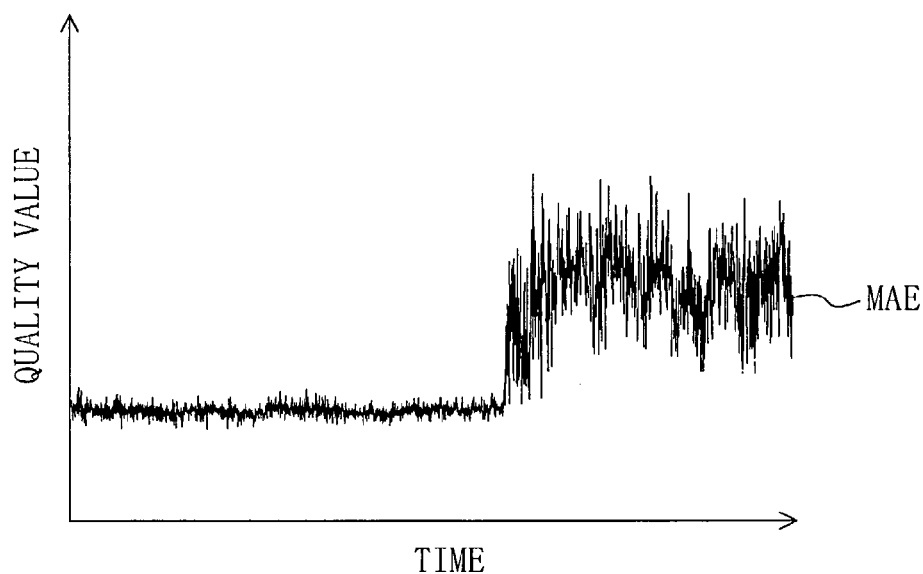
FIG. 7A shows time shift of a quality value calculated in total (i.e., not on an output level-by-output level basis of the FIR filter)

When a PR(3, 4, 4, 3)ML method is used, the output of the FIR filter 5 is divided into five levels a to e as shown in FIG. 6. In step ST206, quality values MAEa to MAEe may be respectively calculated for the five levels a to e. This provides the following effects:

If signal processing is not successfully conducted due to an asymmetry phenomenon or the like, at least one of the waveforms of the outputs a to e of the FIR filter 5 may be distorted from a certain point of time. If the quality value MAE is calculated in total (i.e., not on a level-by-level basis) in this state, the value MAE varies as shown in FIG. 7A. In this case, the distorted portion of the waveform cannot be specified.

Figure 7B:
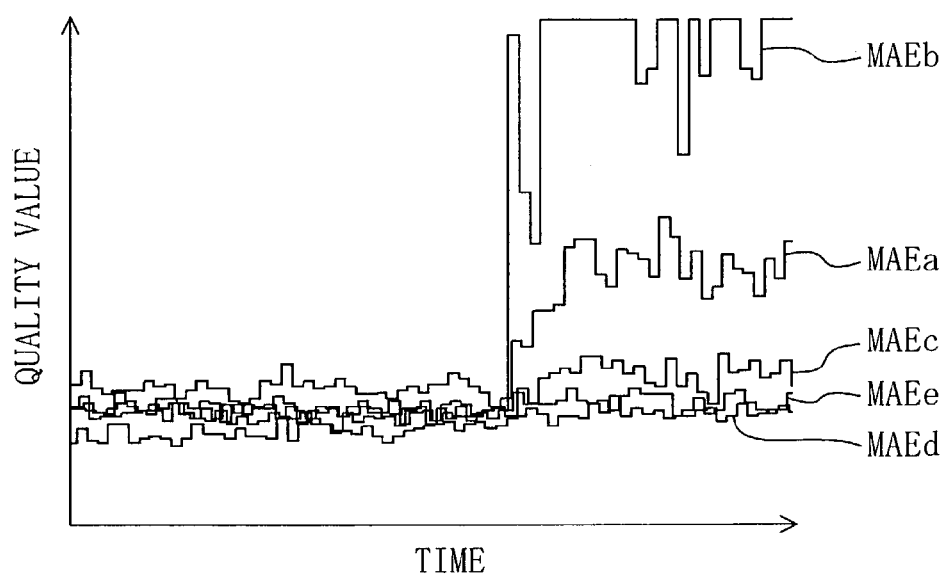
FIG. 7B shows time shift of quality values respectively calculated for the output levels of the FIR filter.

FIG. 7B shows the case where the quality values MAEa to MAEe are respectively calculated for the five output levels a to e of the FIR filter 5. In this case, the distorted portion of the waveform can be specified. In the example of FIG. 7B, the quality values MAEa, MAEb are significantly degraded. In other words, the waveforms of the output levels a, b of the FIR filter 5 are significantly distorted.

Moreover, by changing (weighting) the step size of the LMS algorithm according to the quality values MAEa to MAEe calculated for the respective output levels a to e of the FIR filter 5, calculation can be completed quickly. For example, the step size for the specified distorted portion (in the example of FIG. 7B, the output levels a, b) is made larger than the step size for the other portions (in the example of FIG. 7B, the output levels c, d, e). By weighting the tap coefficient in this way, the overall calculation can be performed quickly.

What is claimed is:

1. A signal processor, comprising:
   an analog filter for removing high-frequency noises of a played-back signal from an optical disk and amplifying a specific frequency band of the played-back signal;
   an analog-to-digital (A-D) converter for converting the played-back signal from the analog filter into a digital signal;
   an adaptive equalization filter for performing waveform equalization of the played-back signal from the A-D converter while adjusting a tap coefficient of the adaptive equalization filter so as to reduce a difference between an output of the adaptive equalization filter and a target value;
   a quality value calculating circuit for calculating an average value of absolute values of the difference between the output of the adaptive equalization filter and the target value within a prescribed time, and outputs the calculated average value as a quality value; and
   a control circuit for comparing the quality value calculated by the quality value calculating circuit with a predetermined reference value, and conducting a process for improving the quality value according to the comparison result.

2. The signal processor according to claim 1, further comprising:
   a memory for storing unique reference information of a recording medium together with a corresponding parameter, wherein
   the parameter is used to adjust the analog filter and the adaptive equalization filter so that a quality value upon playing back a recording medium having corresponding reference information becomes smaller than the reference value.

3. The signal processor according to claim 2, wherein, when reference information of a recording medium to be played back matches the reference information stored in the memory, the control circuit adjusts the analog filter and the adaptive equalization filter according to the parameter stored together with the reference information in the memory.

4. The signal processor according to claim 2, wherein, when reference information of a recording medium to be played back matches the reference information stored in the memory, the control circuit stops operation of the quality value calculating circuit.

5. The signal processor according to claim 1, wherein the adaptive equalization filter performs PR (Partial Response) equalization of the played-back signal from the A-D converter, and
   the quality value calculating circuit calculates a quality value for each output level of the adaptive equalization filter based on a difference between each output level of the adaptive equalization filter and a corresponding target value.

6. The signal processor according to claim 5, wherein the control circuit weights the tap coefficient of the adaptive equalization filter according to each quality value calculated by the quality value calculating circuit.

7. The signal processor according to claim 1, further comprising:

a display for displaying the quality value calculated by the quality value calculating circuit.

8. The signal processor according to claim 1, wherein the control circuit changes filter characteristics of the analog filter according to the comparison result.

9. The signal processor according to claim 1, wherein the control circuit discontinues updating of the tap coefficient of the adaptive equalization filter according to the comparison result.

* * * * *